United States Patent [19]

Okami

[11] Patent Number: 4,934,823
[45] Date of Patent: Jun. 19, 1990

[54] STAGING METHOD AND SYSTEM IN ELECTRONIC FILE APPARATUS

[75] Inventor: Yoshinori Okami, Minamiashigara, Japan

[73] Assignee: Hitachi, Ltd., Tokyo, Japan

[21] Appl. No.: 117,525

[22] Filed: Nov. 6, 1987

[30] Foreign Application Priority Data

Nov. 10, 1986 [JP] Japan ............................ 61-265487

[51] Int. Cl.⁵ ........................... G06F 9/46; G06F 7/38
[52] U.S. Cl. ................................ 364/200; 364/240.5;
364/238.4; 364/245; 364/299.4
[58] Field of Search ... 364/900 MS File, 200 MS File;
358/296

[56] References Cited

U.S. PATENT DOCUMENTS

| | | | |
|---|---|---|---|
| 4,443,845 | 4/1984 | Hamilton et al. | 364/200 |
| 4,468,730 | 8/1984 | Dodde et al. | 364/200 |
| 4,490,747 | 12/1984 | Yokoyama | 358/296 |
| 4,503,494 | 3/1985 | Hamilton et al. | 364/200 |
| 4,583,160 | 4/1986 | Iguma | 364/200 |
| 4,636,974 | 1/1987 | Griffin | 364/900 |

Primary Examiner—Raulfe B. Zache
Assistant Examiner—Glenn Richman
Attorney, Agent, or Firm—Antonelli, Terry & Wands

[57] ABSTRACT

In a staging method and system for an unrewritable storage medium such as an optical disk in which the updating or deletion of stored information is possible only by annotatively recording information concerning the updating or deletion, information stored in the medium before any alteration or charge including addition, updating and deletion is made to the medium is staged on a staging file while positions of the read or staged information are stored on a management file. Thereafter, the last end of the information staged on the staging file is detected by referring to the information positions stored on the management file. Then, information concerning the addition is additionally recorded at a location on the staging file after the previously staged information while information concerning the updating or deletion is used to update or delete the information on the staging file at a location indicated by the information concerning the updating or deletion.

12 Claims, 6 Drawing Sheets

STAGING METHOD AND SYSTEM IN ELECTRONIC FILE APPARATUS

BACKGROUND OF THE INVENTION

The present invention relates to a staging (or data rereading) method and system, and more particularly to a staging method and system capable of shortening a search time when data are read and retrieved or searched from an unrewritable and removal medium such as an optical disk.

As the conventional staging method is known a reading method disclosed in No. JP-A-57-13546. According to this method in which data are read from a sequential file having keyed records, the reading of blocks is carried out by recording the positions of the first and last records in each block and referring to the position information. Namely, node numbers (i.e., key information of records) of the first block to the last block are first written in a staging designation range setting device. Thereafter, all the records 1 to n are read so that the position information is written in a record position register while the reading of the first block is performed. Since the position numbers of the first and last records in each block are thus written in the record position register, the reading of the second block and the subsequent blocks is made referring to those position numbers. In this method, the number of times of reading equal to the total number of records plus the number of records in the second and subsequent blocks is required.

In the above-mentioned conventional method, only the reading from a medium such as a magnetic tape or magnetic disk to which the writing has been made, is taken into consideration. No consideration is taken to a removal and unrewritable medium such as an optical disk. For such a medium, therefore, in the case where the medium subjected to any alteration or modification such as addition, updating and/or deletion by another device is again processed, it is necessary to read over the entire file again from the beginning to the end.

In an electronic file device using an optical disk, alteration such as addition, updating and/or deletion is effected by additionally or annotatively recording alteration information on a blank region of the optical disk.

In the electronic file device, when a plurality of optical disks are searched at once, titles on the optical disks, for example, names added to picture images are preliminarily staged on a staging file including a non-volatile memory such as a magnetic disk, a desired title is searched from the titles staged on the staging file, and a picture image data corresponding to the searched or located title is read from one of the optical disks. In that case, if any alteration such as addition, updating and/or deletion is to be made, data of both the optical disks and the staging file should be simultaneously altered, thereby preventing any deviation or anti-coincidence of data between the optical disks and the staging file. However, if the optical disk is removed after the staging and the alteration such as addition, updating and/or deletion is made to the optical disk in another electronic file device, the optical disk would have information of the alteration additionally or annotatively recorded thereon. Therefore, a deviation or discrepancy exists between the information on the optical disk and the data in the staging file on which the data were previously staged. Accordingly, staging must be carried out again for searching of picture image data. As a result, a time required for reading of data is remarkably elongated.

Further, in the case where an electronic file (device) is used in common by a plurality of terminals or retrieval devices, the fact that the time necessary for the staging for each terminal is long, obstructs the access from the other terminals, thereby lowering the availability and operation rate of the electronic file (device).

SUMMARY OF THE INVENTION

An object of the present invention is to improve the transfer rate in staging upon data retrieval from a medium such as optical disk. Namely, the present invention aims at providing a staging method and system capable of minimizing the staging time, i.e. a time necessary for rereading data written on the medium such as optical disk.

Another object of the present invention is to provide a staging method and system capable of improving the operation rate of an electronic file device commonly accessable from a plurality of data retrieval devices by shortening the staging time.

To that end, in a staging method and system according to the present invention, after information concerning retrieval key word or key code stored on an electronic file medium such as an optical disk before addition, updating and/or deletion is staged on a staging file while storing positions (or pointers) of the read key word or key code information on a management file, the last end of information stored in the staging file is detected so that addition information additionally recorded on the medium by the alteration is read from the medium to record it at a predetermined location on the staging file having the staged information while information concerning the updating and/or deletion annotatively recorded on the medium by the alteration is used to update and/or delete the corresponding information location on the staging file having the staged information.

For an unrewritable medium such as an optical disk, only information to be added can be additionally recorded on the medium. When it is desired to update or delete the recorded information, only information concerning the updating or deletion (i.e. information indicative of the updating or deletion and information indicative of the position of data to be updated or deleted) is annotatively recorded after consecutive data which have already been recorded. This scheme of recording is utilized in the present invention. In the present invention, since it is not necessary to read the previously staged data again from a master file such as an optical disk onto a staging file, only data following the data previously read on the staging file are read from the master file to alter the previously staged data. More especially, the last position of information stored in the title/index storage areas of the medium is detected by means of a well-known blank block searching function, and only information concerning addition, updating and/or deletion recorded on a blank block following the last position of the previously read data is read from the medium and transferred to the staging file including a non-volatile memory such as a magnetic disk so that a necessary treatment concerning the addition, updating and/or deletion is made to the staging file. With such a construction, a need to read the previously staged data again is eliminated and hence the number of times of reading and the amount of data to be processed can be greatly reduced, thereby shortening the staging time the present invention is suitably applied to a stand-alone multi-cabinet retrieval system, type "HITFILE 650" fabricated by Hitachi, Ltd.

DESCRIPTION OF THE PREFERRED EMBODIMENTS

Embodiments of the present invention will now be explained in detail referring to the accompanying drawings.

Figure 2:
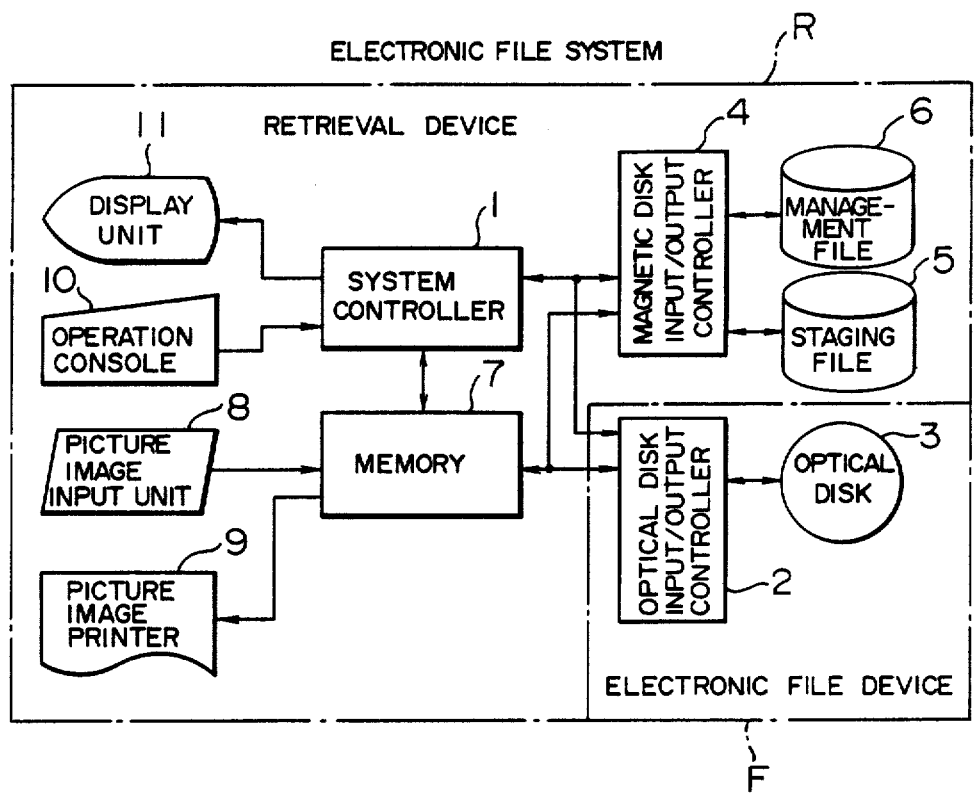
FIG. 2 is a block diagram of an electronic file system according to the embodiment of the present invention.

FIG. 2 shows a block diagram of an electronic file system to which the present invention is applied and in which an electronic file device using a removable and unrewritable optical disk is employed. The electronic file system includes a retrieval device R and an electronic file device F. The retrieval device R is composed of a system controller 1, a memory 7, a magnetic disk input/output controller 4, a staging file memory 5, a management file memory 6, a picture image input unit 8, a picture image printer 9, an operation console 10 including a keyboard or the like, and a display unit 11. The electronic file device F includes an optical disk input/output controller 2 and has a disk read/write mechanism for mounting detachably an optical disk 3 in which document titles, page data and picture image data are stored.

The optical disk 3 is a medium containing recorded data a process for reading of which the present embodiment concerns. The staging file 5 is a file for storing reread data and the management file 6 is a file for storing pointers of the previously read (pre-read) data (or title positions). In the operation console 10, inputting of titles to be prefixed to picture images or the other operations are made by an operator. The display unit 11 is provided for displaying picture image data read from the optical disk 3 so that it can be monitored by the operator. The picture image input unit 8 is a device for reading a picture image on a document in order to store it into the optical disk 3. The picture image printer 9 is provided for printing out the picture image data read from the optical disk 3. The memory 7 is provided for temporarily storing data before the data is stored into the optical disk 3 or before the data read from the optical disk 3 is outputted. The system controller 1 controls the entire electronic file system.

In accordance with a command from the operation console 10 by the operator, picture image data on a document is read by the picture image input unit 8 and the read picture image data is stored into the optical disk 3 through the optical disk input/output controller 2 together with titles (or names prefixed to the picture images) inputted from the operation console 10 by the operator. The optical disk 3 is a removable medium. In the case where search to a plurality (for example, several thousands) of optical disks is desired, the titles stored on the optical disk 3 is preliminarily read from the optical disk 3 and stored in the staging file 5 through the magnetic disk input/output controller 4. When the search is made, the titles stored in the staging file 5 are read to determine the present or absence of a desired document, and the picture image data on the optical disk 3 is thereafter read, as required, for delivery to the display unit 11 and/or the picture image printer 9.

Figure 3:
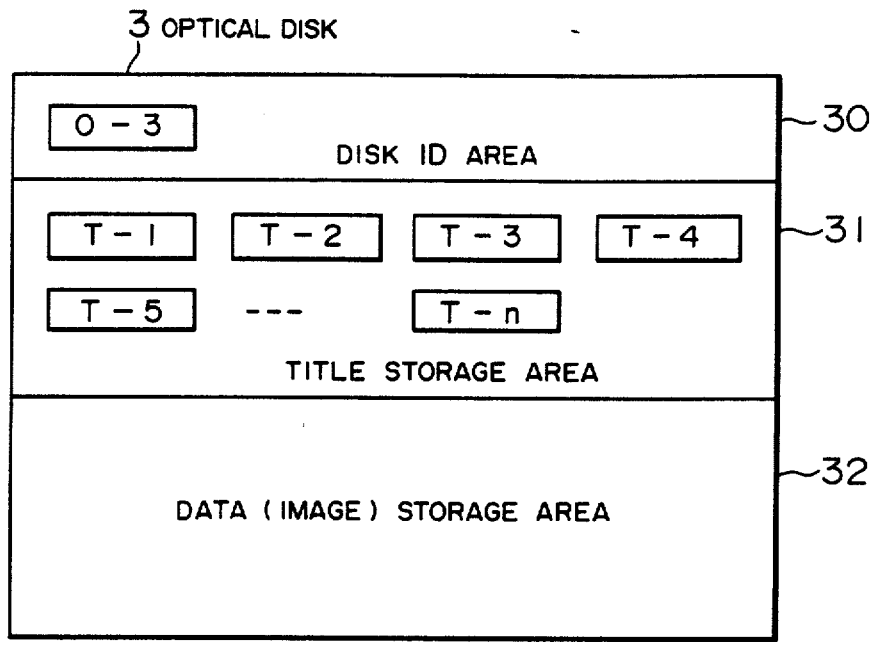
FIG. 3 is a diagram showing the state of storage in an optical disk shown in FIG. 2.
Figure 4:
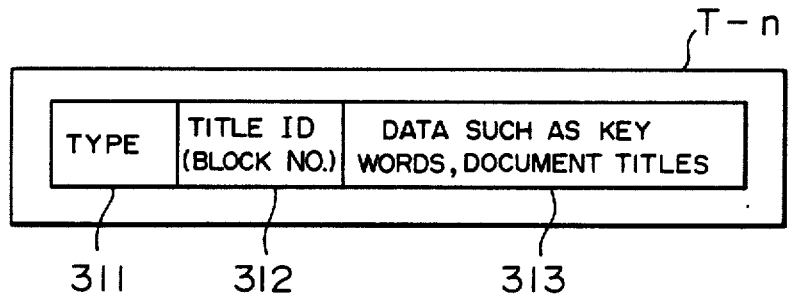
FIG. 4 illustrates a title data format for one title shown in FIG. 3.

FIG. 3 shows the state of storage in the optical disk 3, and FIG. 4 shows a title data format of one title shown in FIG. 3.

As is shown in FIG. 3, the optical disk 3 includes an optical disk identification (ID) area 30, a title storage area 31 and a picture image data storage area 32. The optical disk ID area 30 is an area for storing an identification number which identifies one of a plurality of optical disks 3. The title storage area 31 stores a plurality of titles T-1 to T-n. As is shown in FIG. 4, each title is composed of a type field 311 which represents the type of treatment to be made to the title, a title ID field 312 which represents a unique number (block number) of the title, and a data field 313 which represents information concerning a document title and the storage position of picture image data. In the type field 311, "A" (addition), "U" (update) or "D" (delete) is recorded for addition, updating or deletion. In the title ID field 312, a new title number is recorded in the case of addition. In the case of updating or deletion, the title number corresponding to the title to be updated or deleted is recorded. Namely, even in the case of updating or deletion, the updating or deletion is realized by such recording.

Figure 1:
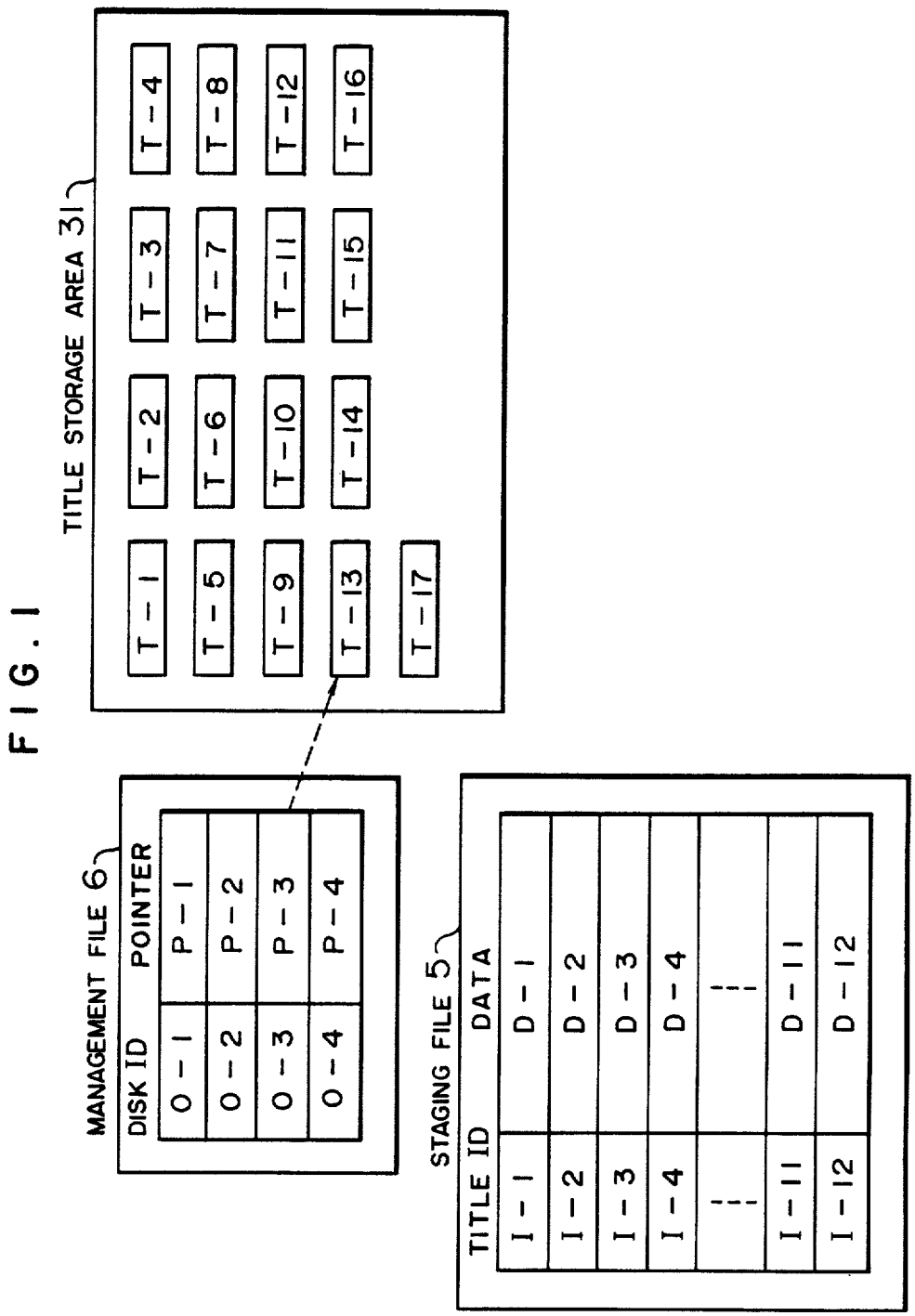
FIG. 1 shows the states of storage in a management file, a staging file and a title storage area of an optical disk in a staging process according to an embodiment of the present invention.

FIG. 1 shows the states of storage in the management file 6, the staging file 5 and the title storage area 31 of the optical disk 3 when the staging process according to the embodiment of the present invention is made. The shown example illustrates a relation between the management file 6 and the title storage area 31 of the optical disk 3 in the case where the optical disk 3 having titles T-13 to T-17, as well as the titles T-1 to T-12 which have already been staged on the staging file 5 are to be staged on the staging file 5. The management file 6 includes optical disk ID fields which store disk ID information recorded in the disk ID areas 30 of the optical disks 3 and pointer fields each of which stores the positions of titles previously read and indicates the position of a title to be next read. The disk ID information identifying each of optical disks having a possibility that they are subjected to staging, is stored in the disk ID field of the management file 6. In the shown example, 0-1 to 0-4 identifying four optical disks 3 are stored. Pointers P-1 to P-4 corresponding to the respective optical disks are stored in the pointer fields. Each pointer indicates the position of a title to be read. In the shown example, the pointer P-3 corresponding to the disk ID 0-3 indicates the title T-13 next to the titles which have already been staged.

The staging file 5 includes title ID fields which store title ID's recorded in the title ID fields 312 of the title storage area 31 of the optical disk 3, and data fields which store data such as document titles recorded in the data fields 313 of the title storage area 31 of the optical disk 3. In FIG. 1, the title ID's stored in the ID fields of the staging file 5 are indicated by I-1 to I-12 and the data stored in the data fields thereof are indicated by D-1 to D-12. Thus, all the contents of the titles excepting the types are stored in the staging file 5.

Figure 5:
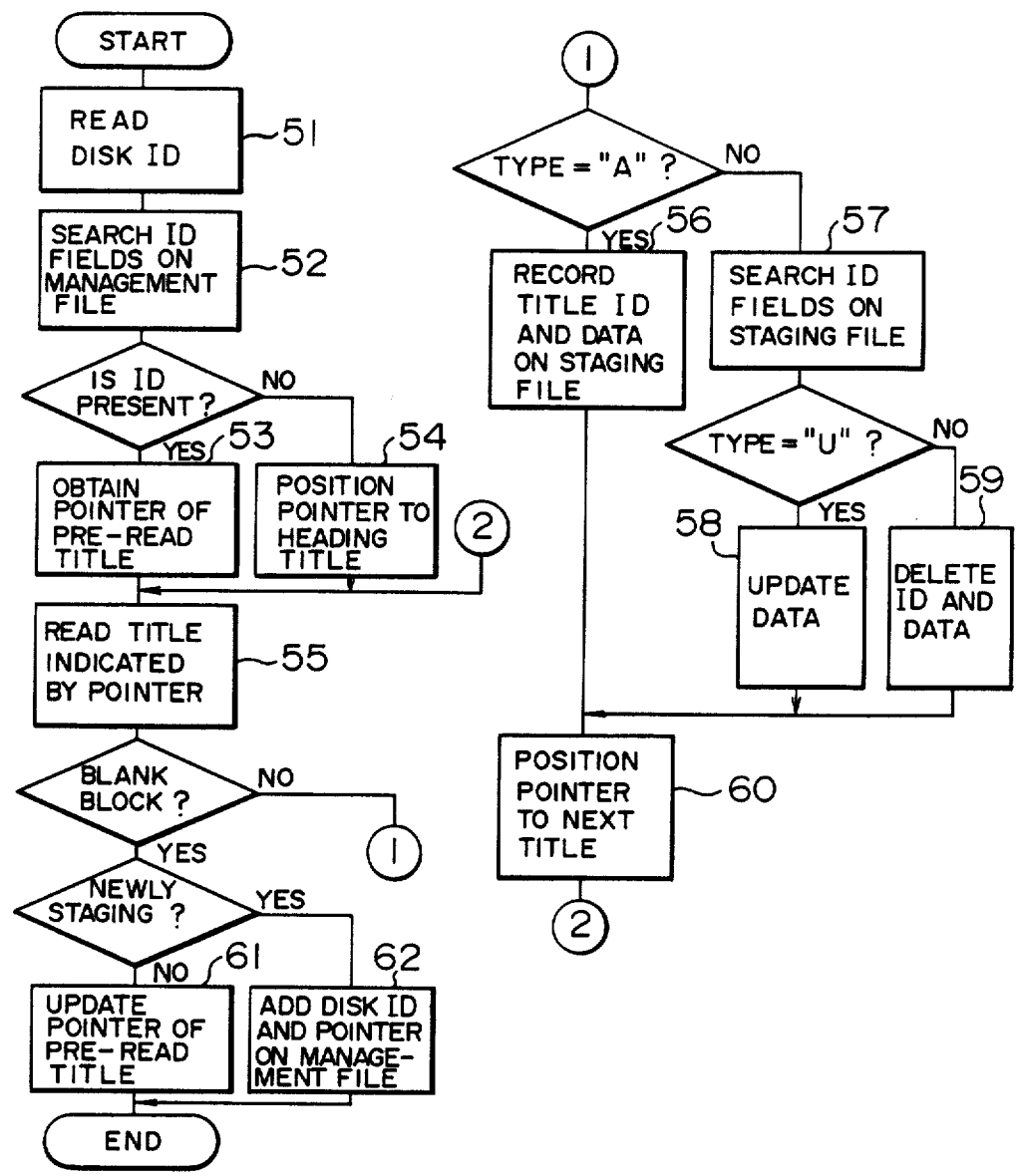
FIG. 5 is a flow chart of the staging process explained with reference to FIG. 1.

FIG. 5 is a flow chart for explaining the staging method in FIG. 1. In the staging process, an optical disk ID 30 (0-3) is first read from the optical disk 3 (step 51). Next, the disk ID fields on the management file 6 are searched to obtain a pointer (P-3) corresponding to the read disk ID (0-3), thereby recognizing the last position (T-12) of previously read titles (steps 52 and 53). Since the pointer P-3 indicates the title T-13 following immediately after the previously read titles, the title T-13 in the title storage area 31 on the optical disk 3 is read (step 55). When the type field 311 of the title T-13 represents "A" (addition), the corresponding title ID 312 and data 313 are recorded at an end portion of staging file 5 or after the data previously staged (step 56). On the other hand, when the type represents "U" (update) or "D" (delete), the corresponding title ID 312 is used as a key word or key code to search one of the title ID fields (I-1 to I-12) on the staging file 5 (step 57) and to update or delete one of the data fields (D-1 to D-12) on the staging file 5 corresponding to the located title ID (step 58 or 59). Thereafter, the pointer is positioned to the next title (step 60) and the step is returned to the step 55. If a blank block is detected by means of a well-known blank block searching function or mechanism, there results in the detection of the completion of staging of the last title T-17 and the pointer P-3 on the management file 6 is updated so as to indicate T-18 (step 61).

In the above-mentioned staging process, when no disk ID field exists as a result of search of the disk ID fields on the management file 6 at the step 52, it is recognized that the optical disk 3 being read is one which was previously subjected to no staging. In newly staging such an optical disk 3, the staging is started from the heading title (step 54). Upon completion of this staging, a disk ID 30 (0-5) identifying that optical disk 3 and a pointer (P-5) indicative of the position of a blank are added to the disk ID and pointer fields of the management file 6, respectively (step 62).

Thus, when the optical disk previously subjected to staging is again staged, only information concerning the block(s) including any alteration is read, thereby shortening the staging time.

For example, assume that an optical disk having about ten thousands of picture image data unit stored in document units of 4 to 5 pages was previously subjected to staging and the staging time required was 6 millisec- onds per one document unit and totally 60 seconds. When staging is again made to the optical disk after addition, updating and deletion have been made to one thousand of picture image data units; the conventional staging method would require 66 seconds but the present embodiment requires only 6 seconds since it is not necessary to read the previously read data again and it is sufficient to read only data concerning the addition, updating and deletion.

Accordingly, when the present embodiment is applied to an electronic file system which handles a great amount of picture image data, the staging time can be greatly saved.

In the embodiment, the staging information is stored in the staging file memory 5 using the magnetic disk. However, the staging information may be stored in any memory which has a large capacity like the magnetic disk.

Figure 6:
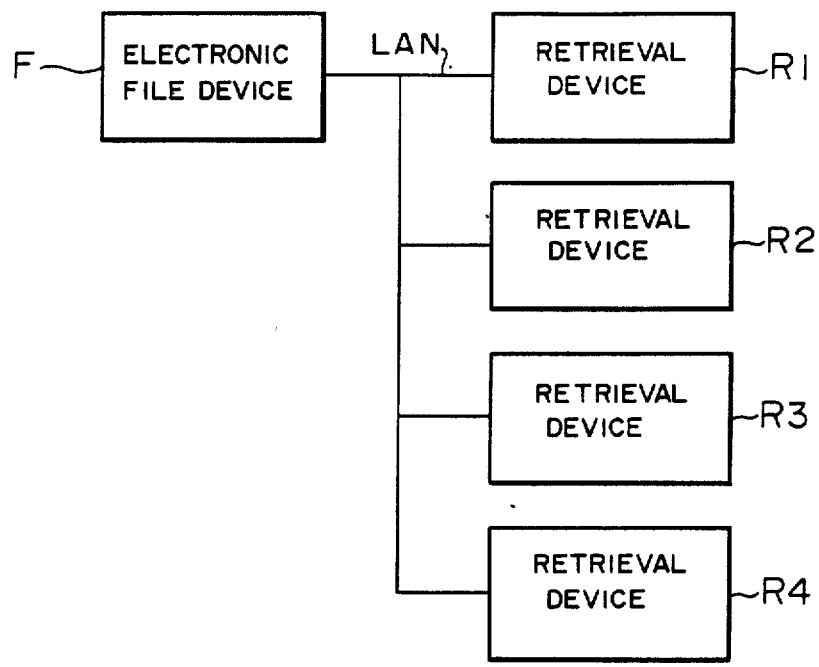
FIG. 6 is a block diagram of an electronic file system according to another embodiment of the present invention.

FIG. 6 shows a composite electronic file system according to another embodiment of the present invention which includes a plurality of retrieval devices R1 to R4 and an electronic file device F which is interconnected with the retrieval devices through a communication network such as a local area network (LAN) for common use. Keyword or title information stored on an optical disk included in the electronic file device F is staged at high speed onto a staging file provided in each of the retrieval devices R1 to R4.

More especially, each of the retrieval devices R1 to R4 has the same function as shown by the dotted chain line R of FIG. 2. The optical disk 3 mounted to the electronic file device F can be commonly accessed by the retrieval devices R1 to R4. Titles recorded on the optical disk 3 of the electronic file device F are staged through the LAN onto respective staging files 5 of the retrieval devices R1 to R4. Upon searching, each of the staging files 5 is searched and data on the optical disk 3 of the electronic file device F is read through the LAN. With such a construction, a load imposed on the electronic file device F can be distributed.

However, the retrieval devices R1 to R4 are independent devices from one another. Therefore, for example, when any alteration is made in conjunction with the retrieval device R1 and the alteration is not communicated to the other retrieval devices R2 to R4, a deviation or non-coincidence takes place between the contents of the staging files 5 of the respective retrieval devices and the titles on the optical disk of the electronic file device F.

Figure 7:
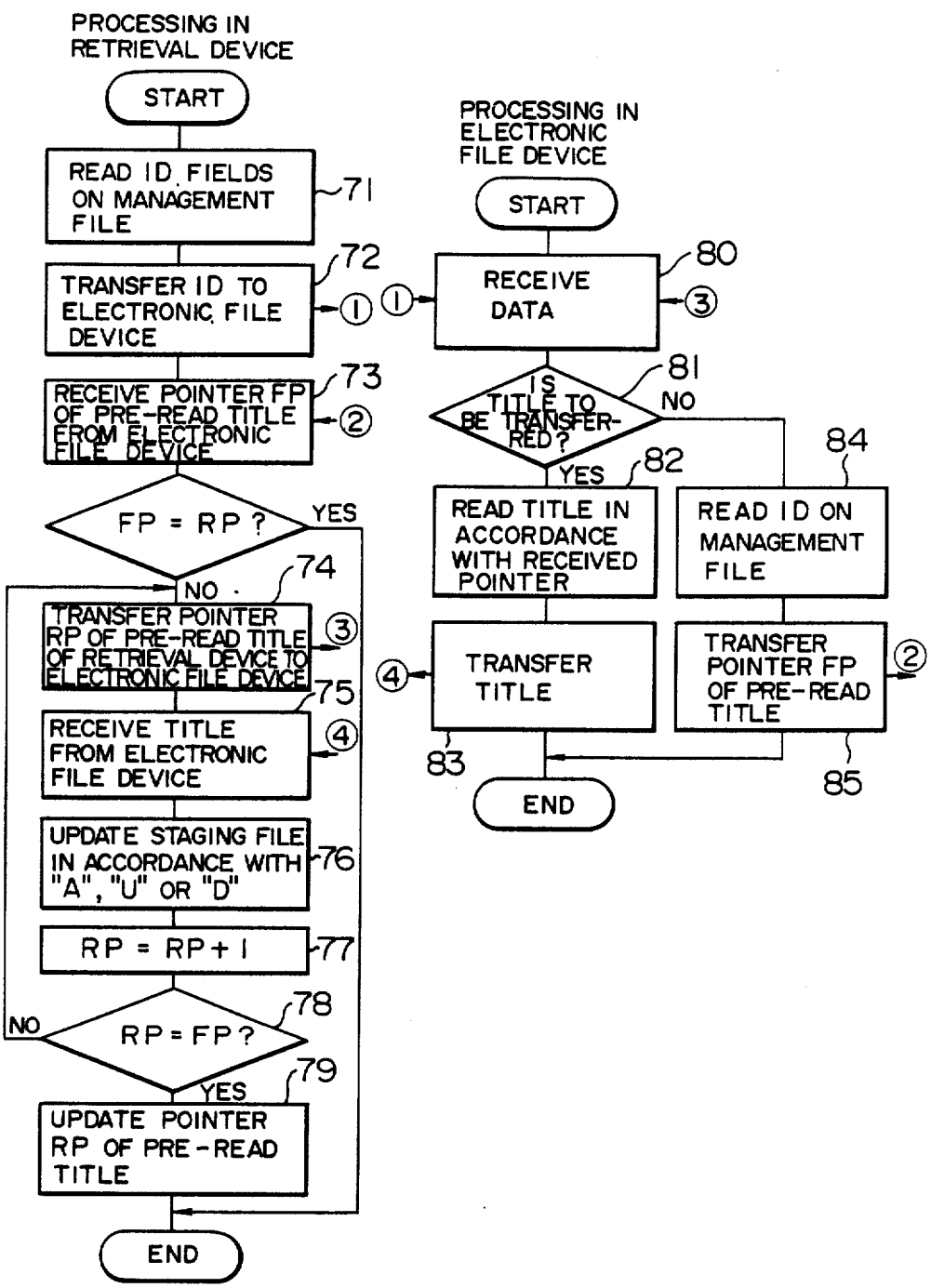
FIG. 7 is a flow chart of the staging process carried out in the system of FIG. 6.

In order to recover or prevent the staging files involving the deviation, staging must be made again, normally for each retrieval operation. The present invention is applied for performing this staging in such a manner that only information concerning the alteration is transferred to the staging file through the LAN. The staging operation steps required are as illustrated in FIG. 7. The flow chart of FIG. 7 will be apparent from the explanations made in conjunction with FIG. 5.

In operation, in the retrieval device R, a disk ID of an optical disk to be retrieved is read from the management file 6, and thereby a pointer RP indicating the position of disk information already read on its staging file 5 is obtained (step 71). Subsequently, in order to obtain a pointer FP indicating the position of the read disk information in the electronic file device a command for request of FP and the optical disk ID are transferred from the retrieval device to the electronic file device (step 72). On the other hand, in the electronic file device, a data is received to receive a request and the associated information from the retrieval device (step 80). If the received data is an FP request in a step 81, an optical disk ID on a management file which may be provided in the electronic file device (not shown) is read out to obtain an FP data (step 84). Alternatively, the FP data may be taken out directly from the loaded optical disk using the known search-for-blank block function. The FP data thus obtained is transferred to the retrieval device (step 85). In the retrieval device, the FP data is received (step 73) and collated with the RP. If RP is equal to FP, the retrieval processing is terminated. If RP is not equal to FP, a command for a title request and a pointer indicating the position of a title to be read (which equals RP) are transferred to the electronic file device F (step 74).

The electronic file device F receives a data for requests thereto again when the processing of one request command received from the retrieval device is completed (step 80). When the command is a title request, a title is read based on the received pointer information (step 82) and is transferred to the retrieval device (step 83). The retrieval device performs a processing for alteration as indicated in the flow chart of FIG. 5 including steps 56 to 60, when the title is received from the electronic file device F (steps 75 and 76). The processing is repeated until an updated RP coincides with the FP (step 78). When RP=FP is reached, the pointer FP in the retrieval device is updated (step 79). In such a manner, a staging operation of the electronic file device is completed by the retrieval device.

As an example, assume that a transfer capacity of the LAN is 10 kB/s and the length of one title is 100 bytes, 10 milliseconds are required for transfer per one title or document unit. When this example is applied to the example which has been explained in conjunction with the system shown in FIG. 2, 16 milliseconds (staging time of 6 milliseconds plus transfer time of 10 milliseconds) will be required per one document unit. If the conventional staging method through the LAN is employed, a staging time would require totally 176 seconds. On the other hand, in the case where the present embodiment is applied, a staging process can be completed with 16 seconds. In this case, the staging is started at a point of time at which any deviation is detected. Namely, when the deviation between titles on the optical disk 3 of the electronic file device F and the contents of the staging files 5 of the retrieval devices R1 to R4 is detected at the retrieval devices, the staging can be performed at high speed automatically or through actuation by the operator.

As has been explained, according the present embodiment, a high speed staging through LAN is possible and the load imposed on the electronic file device can be greatly and efficiently reduced by the provision of the respective staging files in the retrieval devices.

I claim:

1. A staging method for an unrewritable medium in which alteration including addition, updating and deletion of stored information is made by additionally recording information of the addition and annotatively recording information of the updating or deletion on said medium, said method comprising the steps of:
   (a) staging, on a staging file, key information of retrieval key words or key codes which are stored on said medium before an alteration including addition, updating or deletion is performed on said medium, and storing on a management file location information representing storage positions of said key information staged in said medium;
   (b) detecting a last end of said key information stored in said staging file before alteration thereof; and
   (c) transferring only alteration information of addition, updating or deletion of said key information from said medium to said staging file to make a processing depending upon the alteration information and updating the location information stored in the management file.

2. A staging method according to claim 1, wherein in said step (c), upon detection of the last end of the information, information of the addition is additionally recorded on said staging file at a location next to the information previously staged thereon while information of the updating or deletion is used to update or delete the corresponding information previously staged on said staging file.

3. A staging method according to claim 1, wherein said medium is removable and has many picture image data units stored thereon, and said medium includes an area which stores an identification number identifying said medium, an area which stores retrieval key words or key codes for the picture image data units, and an area which stores the picture image data units.

4. A staging method according to claim 3, wherein each of said retrieval key words or key codes includes a type of treatment to be made to the associated picture image data unit, an identification number identifying the associated picture image data unit, and data representative of a title of the associated picture image data unit, and wherein in said step (c), the retrieval key words or key codes are successively read in accordance with the information positions indicated by said management file so that when the type included in the keyword or key code indicates the addition, the title data included in the key word or key code is written after the information staged on said staging file while when the type indicates the updating or deletion, said staging file is searched in accordance with the picture image data unit identification number included in the key word or key code to update or delete a location on said staging file corresponding to said identification number and thereafter the position information in said management file is updated.

5. A staging system for an unrewritable medium of the type which an alteration including addition, updating or deletion of stored information is made by additionally recording information of the addition and annotatively recording information of the updating or deletion thereon, said system comprising:
   a storage device for detachably mounting thereon an unrewritable medium and for retrieving information stored on said medium, said information including at least title information which is used for retrieval of said information;
   a retrieval device connected to said storage device, said retrieval device including an input/output device, staging file means connected to said input/output device for staging title information retrieved from said medium, management file means connected to said input/output device for managing information of storage locations of title information stored in said medium and a controller connected to said input/output device, said staging file means, and said management file means and said storage device means for controlling said staging file means, said management file means, said input/output device and said storage device;
   said controller, via said storage device, retrieves and transferring said title information stored on said medium from said medium to said staging file means and said management file means respectively to stage title information on said staging file means and to store location information of the title information on said management file means, refers to said management file means to detect a last end of the title information staged on said staging file means and in response to the detection of the last end of the title information, retrieves via said storage device only alteration information of addition, updating or deletion of title information from said medium and transfers said alteration information to said staging file means so that title information of the addition is written on said staging file means at a location next to the information staged before the alteration while title information of the updating or deletion is used to update or delete the title information on said staging file means at locations indicated by the title information.

6. Information retrieval network system for performing a staging function for an unrewritable medium in which alteration including addition, updating and deletion of stored information is made by additionally recording information of the addition and annotatively recording information of the updating or deletion thereon, said system comprising:

an electronic file device including an unrewritable medium mounted detachably thereto, information concerning retrieval key words or key codes being stored in said medium;

a plurality of retrieval devices connected to said electronic file device, each of said retrieval devices including an input/output device; a staging file, a management file and a controller for controlling the input/output device, staging file and management file;

an interface for interconnecting said plurality of retrieval devices with said electronic file device;

said controller transfers, via said electronic file device the information stored in said medium before alteration, inclusive of the addition, updating and/or deletion, to the staging file and management file of each of said retrieval devices to stage said information on the staging file and store positions of the information on the management file;

said controller refers to the management file of each of said retrieval devices to detect a last end of the information staged on the staging file of each of said retrieval devices before the alteration; and said controller in response to the detection of the last end of the information before the alteration, reads, via said electronic file device, only alteration information concerning the addition, updating and deletion from said medium to the staging file of each of said retrieval devices so that information of the addition is written on the staging file at a location next to the information staged before the alteration while information of the updating or deletion is used to update or delete the information on the staging file at a location indicated by the information of the updating or deletion.

7. A staging system according to claim 6, wherein said interface for interconnecting between said electronic file device and said retrieval devices comprises a large area communication network.

8. A staging apparatus comprising:

a storage device for storing data to be retrieved, said data each having a retrieving key code added thereto;

first file means for storing key codes stored in said storage device;

second file means for managing information representing the storage location of the key codes stored in said first file means on said storage device; and a controller for comparing the storage location of a key code stored in said storage device with the information of storage location of key codes managed by said second file means to determine a key code which is stored in said storage device but is not stored in said first file means, reading out said determined key code from said storage device, transferring the same to said first file means, and updating the information of the storage location of key codes in said second file means, on the determined key code.

9. A staging apparatus according to claim 8, wherein said storage device includes a write-once, read-many recording medium.

10. A staging apparatus according to claim 9, wherein said recording medium is exchangeable and is available for annotation.

11. A staging apparatus for use with a storage device for storing a multiplicity of data to be retrieved, each data having key information for retrieval added hereto, comprising:

staging file means for storing key information stored in said file device;

managing file means for managing information representing the storage location of the key information stored in said staging file means on said storage device; and controller means coupled to said staging file means and said managing file means and adapted to connected to said storage device, for comparing the storage location of key information stored in said storage device with the information representing the storage location of key information managed by said managing file means to determine key information which is stored in said storage device but is not stored in said staging file means, reading out said determined key information from said storage device, transferring the same to said staging file means, and updating the information of the storage location of key information in said managing file means, on the determined key information.

12. A staging apparatus according to claim 11, wherein said storage device includes a recording medium recording data on a write-once, read-many, annotatable record basis.

* * * * *